United States Patent

[11] 3,633,455

[72] Inventor Eugene R. Larson
 Rockford, Ill.
[21] Appl. No. 11,211
[22] Filed Feb. 13, 1970
[45] Patented Jan. 11, 1972
[73] Assignee Textron Inc.
 Rockford, Ill.

[54] SELF-THREAD-FORMING FASTENER WITH EASY THREAD PICKUP
 5 Claims, 7 Drawing Figs.

[52] U.S. Cl. ................................................ 85/46, 10/10 R
[51] Int. Cl. ........................................ F16b 25/00, F16b 33/02
[50] Field of Search ........................... 85/46, 48, 41, 47, 1; 151/22; 10/10 R, 27 R, 152

[56] References Cited
UNITED STATES PATENTS

| | | | |
|---|---|---|---|
| 3,246,556 | 4/1966 | Phipard | 85/46 |
| 3,520,343 | 7/1970 | Evans | 85/46 X |

*Primary Examiner*—Ramon S. Britts
*Attorney*—Buckhorn, Blore, Klarquist and Sparkman ABSTRACT: The work-entering end of a self-thread-forming fastener is provided with a step-tapered portion for initially engaging the sidewall of the pilot hole of a workpiece. The invention is characterized by the fact that the tapered portion is of substantially circular cross section while the radial height of the thread over such step-tapered portion increases from a beginning height less than the diameter of the pilot hole to the full height of the thread on the shank portion in stages. In the first such stage, the crest of the thread increases rapidly in radial height within a small circumferential angle to establish substantial initial thread-forming engagement with the pilot hole. In the second stage, the crest of the thread continues for at least one full thread turn at substantially the same radial height as it achieves in the first stage to insure thread pickup with minimum end loading. In the third stage, the crest of the thread increases in radial height substantially to the maximum radial height of the crest of the thread on the shank portion.

PATENTED JAN 11 1972

EUGENE R. LARSON
INVENTOR

BY
BUCKHORN, BLORE, KLARQUIST & SPARKMAN
ATTORNEYS

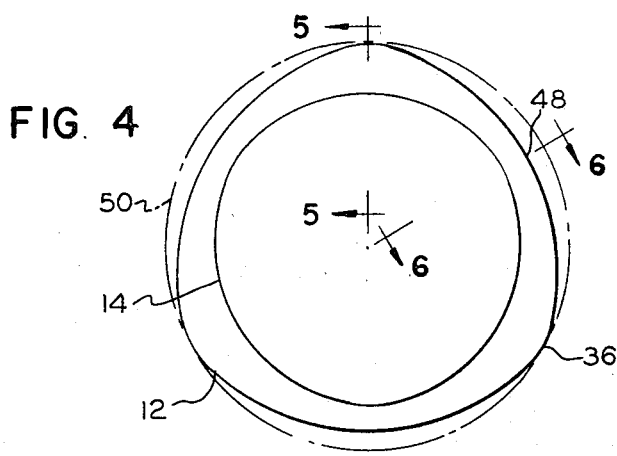
FIG. 4
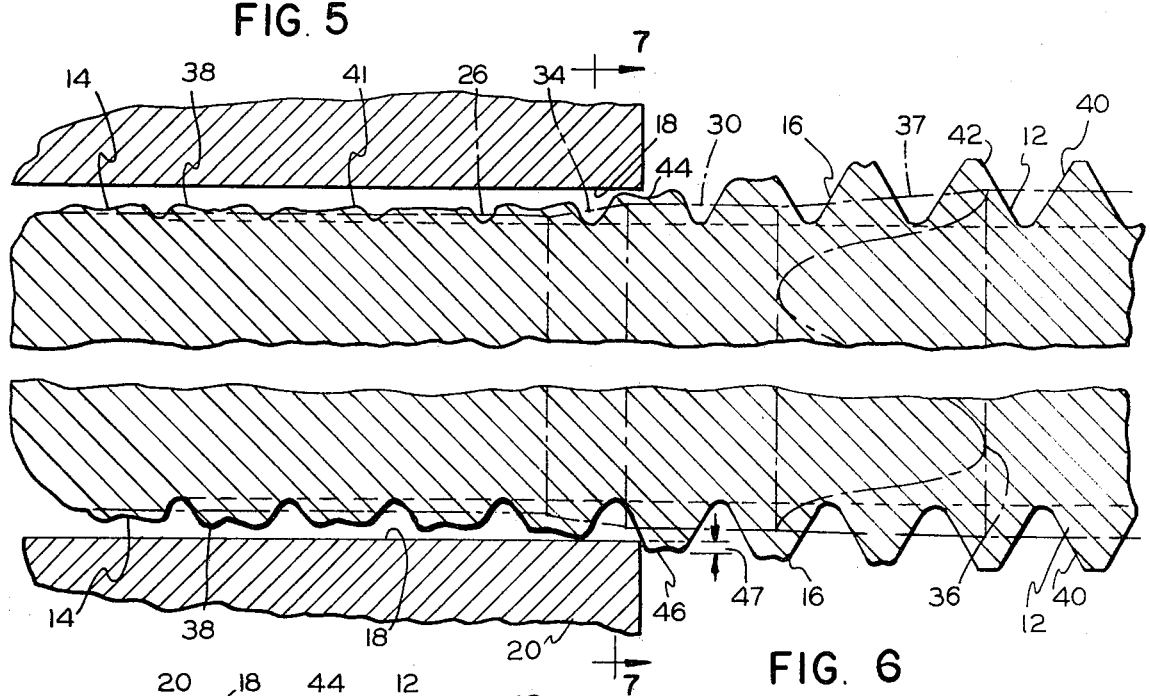
FIG. 5
FIG. 6
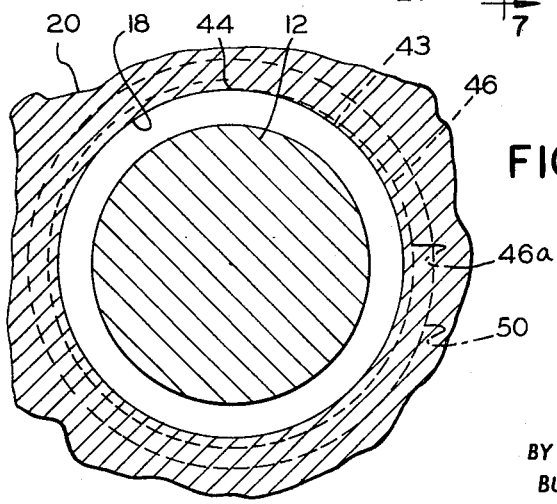
FIG. 7
EUGENE R. LARSON
INVENTOR
BY
BUCKHORN, BLORE, KLARQUIST & SPARKMAN
ATTORNEYS

SELF-THREAD-FORMING FASTENER WITH EASY THREAD PICKUP

BACKGROUND OF THE INVENTION

A problem with self-thread-forming fasteners previously known has been that such fasteners have frequently required a heavy end loading to prevent the forward ends of the thread swaging portions thereof from reaming out the forepart of a pilot hole at the commencement of the tapping of such hole. A heavy required end load is obviously a disadvantage in driving self-tapping screws due to the tiring physical effort involved in assembly operations.

It is thus the principal object of the present invention to provide a self-thread-forming fastener with a work-entering end portion that will minimize the amount of end loading required to engage the thread swaging section into the sidewall of a pilot hole in a workpiece.

It is a further object of the present invention to provide such a fastener with a pilot hole sidewall-engaging thread portion having at least one full thread turn of substantially circular cross-sectional configuration at its work-entering end thereby to maintain such minimal required end loading for at least 360° or until the heavier threads on the shank portion make contact.

It is a still further object of the present invention to provide such a self-thread-forming fastener wherein the substantially circular cross-sectional configuration of the thread on the work-entering end maintains the required driving torque at a low level while providing sufficient bite to start the cutting of the thread.

It is a still further object of the present invention to provide a blank for forming such a self-thread-forming fastener.

SUMMARY OF THE INVENTION

In accordance with the present invention, I provide a self-thread-forming fastener for forming threads in a pilot hole in a workpiece, the fastener having a step-tapered work-entering end portion, a shank portion, and a thread continuing from the shank portion onto the work-entering end portion.

The fastener is characterized by the fact that the thread turn on the tapered portion which is adapted for initially engaging the sidewall of the pilot hole in the workpiece has a crest of substantially circular cross section and a radial dimension greater than the radius of the pilot hole by an amount equal to approximately 20 to 30 percent of the height of the thread on the shank portion. Such thread turn continues at the aforesaid radial dimension for at least one full thread turn, and preferably for approximately 1⅓ thread turns, and thereafter gradually changes in dimension to the dimensions of the thread on the shank portion.

In accordance with the invention, the work-entering end portion of the blank from which the fastener is made is step-tapered. The crest of the thread over such step-tapered portion thus increases in radial height from a beginning height less than the diameter of the pilot hole to its full height at the shank portion of the fastener in stages. In the first stage the crest of the thread increases rapidly in radial height from the aforementioned beginning height within a small circumferential angle, less than one-half a thread revolution, and preferably within approximately 60°, to a radial height approximately 20 to 30 percent of full thread height greater than the radial dimension of the pilot hole, to establish substantial initial thread-forming engagement with the sidewall of the pilot hole in the workpiece.

In the second stage, the crest of the thread continues for at least one full thread turn at substantially the same maximum radial height as it achieves in the first stage. In the third stage, the crest of the thread increases in radial height substantially to that of the crest of the thread on the shank portion.

The method of the invention comprises forming a blank having a shank portion, a work-entering end portion of circular cross section having a diameter smaller than the diameter of the pilot hole, and an intermediate cylindrical portion between the shank portion and the work-entering end portion. The intermediate cylindrical portion is also of circular cross section and has a length equal to at least one full thread turn and preferably 1⅓ thread turns, and a diameter intermediate that of the shank portion and the work-entering end portion.

The blank further comprises other portions which taper conically inwardly from the intermediate cylindrical portion to the work-entering end portion and outwardly from the intermediate portion to the shank portion, thereby to form conical transitional portions which achieve the unique thread configuration above described. The blank is then rolled on a centerless basis to form the continuous thread.

BRIEF DESCRIPTION OF THE DRAWINGS

FIG. 4 is an end view to an enlarged scale of the fastener device illustrated in FIG. 3 and showing in full lines the outline of the major diameter of the pilot end of the fastener and the major diameter of the threaded shank portion, the threads on the step-tapered intermediate portion being omitted in the interest of clarity. The dotted line indicates the circumscribing circle on the shank portion, which is equal to the root diameter of the tapped hole.

FIG. 5 is a sectional view taken on line 5—5 of FIG. 4, the dotted lines showing the configuration of the original blank from which the fastener is constructed.

FIG. 6 is a sectional view taken on line 6—6 of FIG. 3, the dotted lines also showing the configuration of the original blank.

FIG. 7 is a schematic sectional view taken substantially on line 7—7 of FIGS. 5 and 6.

DESCRIPTION OF THE PREFERRED EMBODIMENTS

Figure 1:
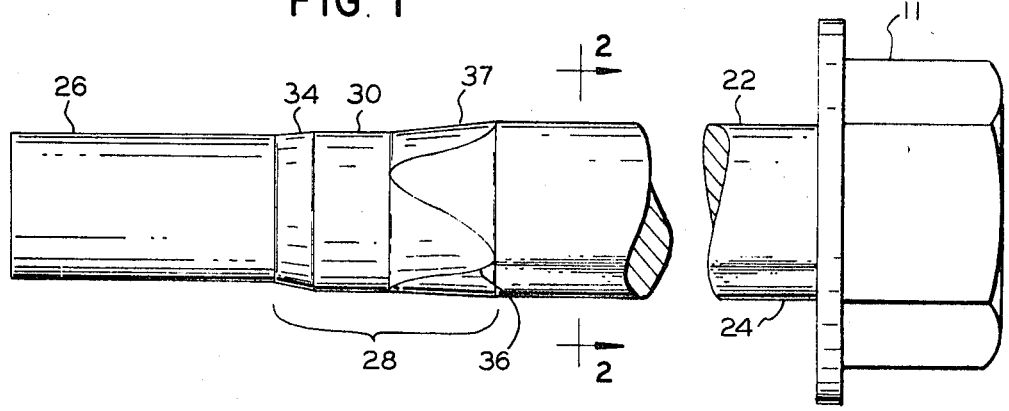
FIG. 1 is a side elevational view of a blank used in the manufacture of a fastener device according to the present invention and having a shank portion of arcuate triangular cross section.

In this application the following definitions shall be applicable.

"Pitch diameter" is used as a generic term to designate the diameter, i.e., maximum transverse width of any section of either the "pitch cylinder" or the "pitch cone" as determined by the three-wire method of pitch diameter measurement. Due to the triangular nature of the shank portion of the particular fastener herein disclosed, the pitch diameter, i.e., maximum transverse width, does not always extend through the axial center of the configuration.

The three-wire method of pitch diameter measurement is well known in the art and is described, for example, in U.S. National Bureau of Standards Handbook No. H28 (1957).

"Pitch cylinder" is, on a straight thread, an imaginary coaxial cylinder the surface of which would pass through the thread profiles, or the projection thereof, at such points as to make the width of the groove, or the projection thereof, equal to one-half the basic pitch. Due to the triangular configuration of the cross section of the shank portion of the particular fastener herein disclosed, the pitch cylinder thereof is not round but of arcuate triangular cross-sectional shape.

"Pitch cone" on a taper thread is an imaginary coaxial cone, the surface of which would pass through the thread profiles, or the projection thereof, at such points as to make the width of the groove or the projection thereof equal to one-half the basic pitch.

"Pitch surface" is used herein to designate the surface of revolution of the pitch line defining either the pitch cylinder or the pitch cone as hereinbefore defined.

"Pitch surface cross section" is used herein to designate the transverse cross section of any pitch surface, such as that of either the pitch cylinder or the pitch cone, as hereinbefore defined. For reasons mentioned above, it may be of arcuate triangular configuration.

"Radial height" is the distance measured from the axis of the fastener to the crest of the thread.

"Thread height" is the distance measured perpendicularly to the axis between the root and the crest of the thread.

Referring now to the drawings, a self-thread-forming fastener according to the present invention is illustrated in the form of a dog-point, self-thread-forming fastener 10 having a head 11 at one end thereof, a shank portion 12, a threaded dog-point 14, and a step-tapered thread-forming intermediate portion 16. While in the illustrated embodiment the shank portion 12 is of arcuate triangular configuration, it is to be understood that the invention is not to be limited to any particular configuration of the shank portion, which may be of any well-known cross-sectional shape. A continuous thread is provided on the sections 12, 14 and 16. The dog-point 14 is provided to facilitate driving the fastener 10 straight; that is, in coaxial alignment with a hole 18 in a workpiece 20. The step-tapered intermediate portion 16 is the thread swaging section which forms the thread in the sidewalls of the hole 18 in the workpiece 20.

Figure 3:
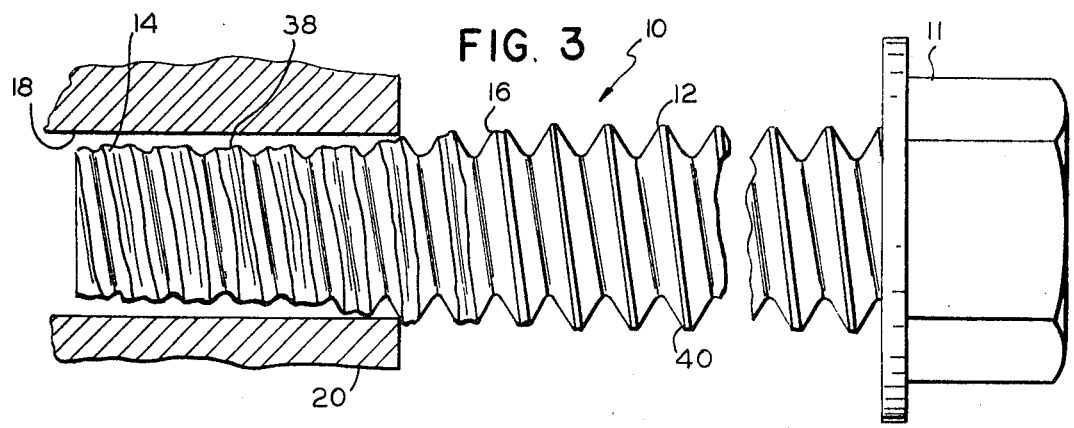
FIG. 3 is a side elevational view of a self-thread-forming fastener constructed in accordance with the present invention and made from the blank illustrated in FIG. 1.
Figure 2:
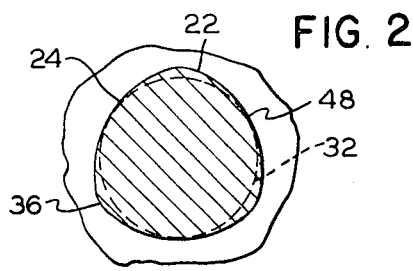
FIG. 2 is a sectional view taken on line 2—2 of FIG. 1.

FIGS. 1 and 2 illustrate a blank 22 from which the fastener 10 illustrated in FIG. 3 is made. The blank 22 comprises a shank portion 24 of arcuate triangular cross section, and a work-entering end portion 26 of circular cross section having a diameter smaller than the diameter of the pilot hole 18. The portion 26 as illustrated is approximately four thread turns in length, although it may be made as long as the specific application requires or it may be substantially omitted entirely.

A step-tapered intermediate portion 28 is provided between the shank portion 24 and the work-entering end portion 26. Such intermediate portion 28 itself comprises an intermediate circular cylindrical portion 30 having a length equal to at least one full thread turn and preferably 1⅓ thread turns. The diameter of the cylindrical portion 30 is slightly greater than the diameter of the portion 26 and, as shown in FIG. 2, is substantially equal to that of the circle 32 that can be inscribed within the arcuate triangular shank portion 24. In a fastener having a circular shank, the diameter of the intermediate portion is intermediate that of the shank portion and the work-entering end portion.

The intermediate portion 28 further comprises a portion 34 which tapers conically inwardly from the portion 30 to the work-entering end portion 26 over a length approximating two-thirds of a thread turn. Another portion 37 tapers conically outwardly from the portion 30 to the shank portion 24 over a length approximating two thread turns when measured to its intersection with the arcuate triangular shank portion 24 at a lobe 36. The overall length of the blank as well as the relative dimensions of the portion 28 are determined by the requirements of each specific application. Rolling the blank 22 on a centerless basis between dies (not shown) forms the continuous thread.

Referring particularly to FIGS. 5 and 6, the dog-point 14 has severely underfilled threads 38 whose crest diameter is less than the diameter of the hole 18. Such underfilled crests 38 increase in height over the step-tapered portion 16 to the completely filled threads 40 of the arcuate triangular shank portion 12.

A feature of the invention is the fact that the increase in radial height of the thread from its beginning height as at 41 on the dog-point 14 to its full height at 40 on the shank portion 12 occurs in stages. In the first stage, and as shown in FIGS. 5, 6 and 7, the crest 43 of the thread increases rapidly in radial height within a small circumferential angle, such as, for example, 60°, from point 44 to establish substantial initial thread-forming engagement at point 46 with the sidewall of the hole 18. Such increase can be noted by comparing the height of the thread at 44 in FIG. 5 which fits within the hole 18 with the height of the same thread at 46 in FIG. 6 only 60° away.

The difference in radial height between the crests of the threads at 44 and 46, which difference is indicated by the numeral 47 in FIG. 6, arises from the increased penetration of the roll thread dies into the tapered portion 34 of the blank 22. Provided threads are underfilled, the greater the penetration of the dies into the surface of the blank, the higher will be the resultant major dimension as measured over the displaced stock. FIG. 6 is a section taken through the fastener 10 in line with a low area 48 intermediate the lobe crests 36 on the shank portion 24. The penetration of the dies into this portion of the blank results in a greater thread crest diameter at the intersection of the conical portion 34 and the cylindrical portion 30 of the blank 22 than the crest diameter of the thread 41 on the blank portion 26.

The radial dimension of the thread at 46 is greater than the radius of the hole 18 by an amount equal to approximately 20 to 30 percent of the height of the thread 40 on the shank portion 12. Such difference in height is also indicated by the numeral 47 in FIG. 6. The crest of the thread at 46 thereafter continues in a second stage substantially at this greater radial height along the intermediate circular cylindrical portion 30 of the blank 22 for at least one full thread turn and in the embodiment illustrated, for 1⅓ thread turns. Thereafter and in a third stage, the thread gradually changes in height and also in cross section along the conical portion 37 from its substantially circular cross section as illustrated by the dotted line 46a in FIG. 7 to an arcuate triangular configuration at 42 as it merges with the thread 40 on the shank portion 12.

In operation the threads 38 on the dog-point 14 provide the axial stability required for the subsequent straight driving of the fastener. Free entry into the hole is prevented by the uptaper of the crest 43 of the thread as it increases in radial height from its height at 44 to its height at 46. Whereas the radial height of the crest of the thread at 46 is substantially greater than the radial dimension of the pilot hole 18, the crest of the same thread only 60° away at 44 is actually in the hole 18.

At this stage in the driving of the fastener 10, the dog-point 14 comes into play. The stability in the hole which the point 14 provides permits end loading of the head 11 of the fastener without danger of tipping it over or crooked starting into the hole.

As the fastener is turned with a slight amount of end loading, the increasing height of the crest 43 of the thread between 44 and 46 begins to tap a matching thread groove of relatively shallow depth in the sidewall of the workpiece. Such shallow depth is maintained for at least one full thread turn. Due to the low height of the thread 46a across the intermediate circular cylindrical portion 30, little effort is required to engage it into the sidewall of the hole. The provision of at least one full thread turn of this substantially circular thread maintains the required torque at a low level but provides enough "bite" to start the tapping of the hole with low-pressure end loading.

As the third stage of the thread on the conical portion 37 is engaged, such thread changes gradually from its substantially circular cross section at 46 to an arcuate triangular configuration at 42 whence it merges with the thread 40 on the shank portion 12. The arcuate triangular shape of such gradually changing thread completes the thread swaging operation that was started by the threads along the first and second stages.

Due to the arcuate triangular cross-sectional shape of the thread-forming thread turns on the tapered section 37 of the blank, the driving torque requirement is held relatively low, notwithstanding that these thread turns penetrate the workpiece to maximum depth. It is to be understood that the thread turn of the second stage, which engages the sidewall of the workpiece throughout substantially 360° tends to draw or pull the fastener into the workpiece thus reducing the amount of manual end loading required for driving the third stage into the workpiece. Moreover, reaming of the mouth of the pilot hole in the workpiece is substantially eliminated. Not until the thread 40 on the shank portion 12 is fully engaged does the full sized triangular portion 12 begin to enter the hole. By this stage, however, the tapping of the hole to its root diameter 50 has been completed, and subsequent rotation of the screw with minimum end loading will drive it to the depth required.

While I have described my invention with respect to the manufacture of one particular embodiment, it should be realized that the invention permits numerous modification as to arrangement and detail. I therefore claim as my invention all such modifications as come within the true spirit and scope of the following appended claims.

What is claimed is:

1. A self-thread-forming fastener for forming threads in a pilot hole in a workpiece and having a pilot end of circular cross section of smaller diameter than said pilot hole, a threaded shank portion of larger pitch surface cross section than said pilot end and a step-tapered thread-forming portion of circular cross section intermediate said pilot end and said shank portion,
   a. the crest of the thread over said step-tapered portion increasing in radial height from a beginning height at said pilot end less than the radius of said pilot hole to its full height in said shank portion in three stages;
   b. in the first stage the crest of the thread increasing rapidly in radial height within a small circumferential angle, less than one-half a thread revolution, to establish substantial initial thread-forming engagement with the sidewall of said pilot hole in said workpiece;
   c. in the second stage the crest of the thread continuing for at least one full thread turn at substantially the same radial height as it achieves in said first stage; and
   d. in the third stage the crest of the thread increasing in radial height substantially to the maximum radial height of the crest of the thread on said shank portion.

2. A self-thread-forming fastener as in claim 1 in which said shank portion has an arcuate triangular pitch surface cross section and said rapidly increasing radial height of said crest of said thread in said first stage occurs at a point on said step-tapered portion in line with an intermediate low area on said shank portion.

3. A self-thread-forming fastener as in claim 2 in which said crest of said thread in said first stage increases rapidly in radial height in approximately 60°.

4. A self-thread-forming fastener as in claim 1 in which said crest of said thread continues in said second stage at a substantially constant radial height for approximately 1⅓ thread turns.

5. A self-thread-forming fastener for forming threads in a pilot hole in a workpiece, said fastener having a tapered work-entering end portion and a shank portion, the shank portion being provided with a thread of arcuate triangular pitch surface cross section, the thread continuing from said shank portion onto said work-entering end portion, the invention being characterized by:
   a. the thread turn on said tapered portion which is adapted for initially engaging the sidewall of the pilot hole in the workpiece having a crest of substantially circular cross section and a radial dimension greater than the radius of said pilot hole by an amount equal to approximately 20 to 30 percent of the height of the thread on said shank portion;
   b. said first-mentioned thread continuing at the aforesaid radial dimension for at least one full thread turn; and
   c. said thread on said tapered portion following said one full thread turn changing gradually from said substantially circular cross section configuration to an arcuate triangular configuration whence it merges with said thread on said shank portion.

* * * * *